US012715315B2

(12) United States Patent
Mühlbauer et al.

(10) Patent No.: US 12,715,315 B2
(45) Date of Patent: Aug. 25, 2026

(54) RAIL VEHICLE, METHOD FOR OPERATING A RAIL VEHICLE AND USE OF A TRACTION BATTERY

(71) Applicant: STADLER RAIL AG, Bussnang (CH)

(72) Inventors: Thomas Mühlbauer, Winterthur (CH); Markus Spillmann, Horgen (CH); Pierre Fechting, Zürich (CH); Jorgen Tscheng, Zürich (CH)

(73) Assignee: STADLER RAIL AG, Bussnang (CH)

(*) Notice: Subject to any disclaimer, the term of this patent is extended or adjusted under 35 U.S.C. 154(b) by 445 days.

(21) Appl. No.: 18/452,625

(22) Filed: Aug. 21, 2023

(65) Prior Publication Data

US 2024/0067004 A1 Feb. 29, 2024

(30) Foreign Application Priority Data

Aug. 23, 2022 (EP) .................................... 22191600

(51) Int. Cl.
*B60L 50/75* (2019.01)
*B60L 58/31* (2019.01)

(52) U.S. Cl.
CPC ............... *B60L 50/75* (2019.02); *B60L 58/31* (2019.02); *B60L 2200/26* (2013.01); *B60L 2210/10* (2013.01); *B60L 2210/40* (2013.01)

(58) Field of Classification Search
CPC .......... B60L 50/70; B60L 50/71; B60L 50/75; B60L 220/26; B60L 2210/10
USPC .......................................................... 104/288
See application file for complete search history.

(56) References Cited

U.S. PATENT DOCUMENTS

| | | | | |
|---|---|---|---|---|
| 5,161,468 A * | 11/1992 | Weeger | B61F 5/52 | 105/167 |
| 7,761,198 B2 * | 7/2010 | Bhardwaj | B60L 1/00 | 307/45 |
| 8,640,629 B2 * | 2/2014 | Barbee | B61C 3/02 | 105/35 |

FOREIGN PATENT DOCUMENTS

| | | | |
|---|---|---|---|
| CN | 104786861 A | 7/2015 | |
| CN | 106828126 A | 6/2017 | |
| CN | 215204856 U | 12/2021 | |
| DE | 102021209042 A1 * | 2/2023 | B60L 50/75 |
| EP | 3 672 014 A1 | 6/2020 | |
| WO | 2004/098064 A2 | 11/2004 | |
| WO | WO-2023286515 A1 * | 1/2023 | B60L 58/19 |

OTHER PUBLICATIONS

European Search Report Corresponding to 22191600.0 mailed Feb. 13, 2023.

* cited by examiner

*Primary Examiner* — Troy Chambers
(74) *Attorney, Agent, or Firm* — Secant IP, P.L.L.C.

(57) ABSTRACT

The invention concerns a rail vehicle (1) comprising a first power supply unit (5) which has at least one, preferably at least two, fuel cells (7), at least one fuel storage (8) and a first fuel cell power converter (10). The first fuel cell power converter (10) comprises a DC/DC converter (12) for each fuel cell (7), the DC/DC converters (12) preferably have outputs which are connected in parallel. The first power supply unit (5) is preferably arranged in a powerpack (2).

16 Claims, 3 Drawing Sheets

RAIL VEHICLE, METHOD FOR OPERATING A RAIL VEHICLE AND USE OF A TRACTION BATTERY

Figure 1:
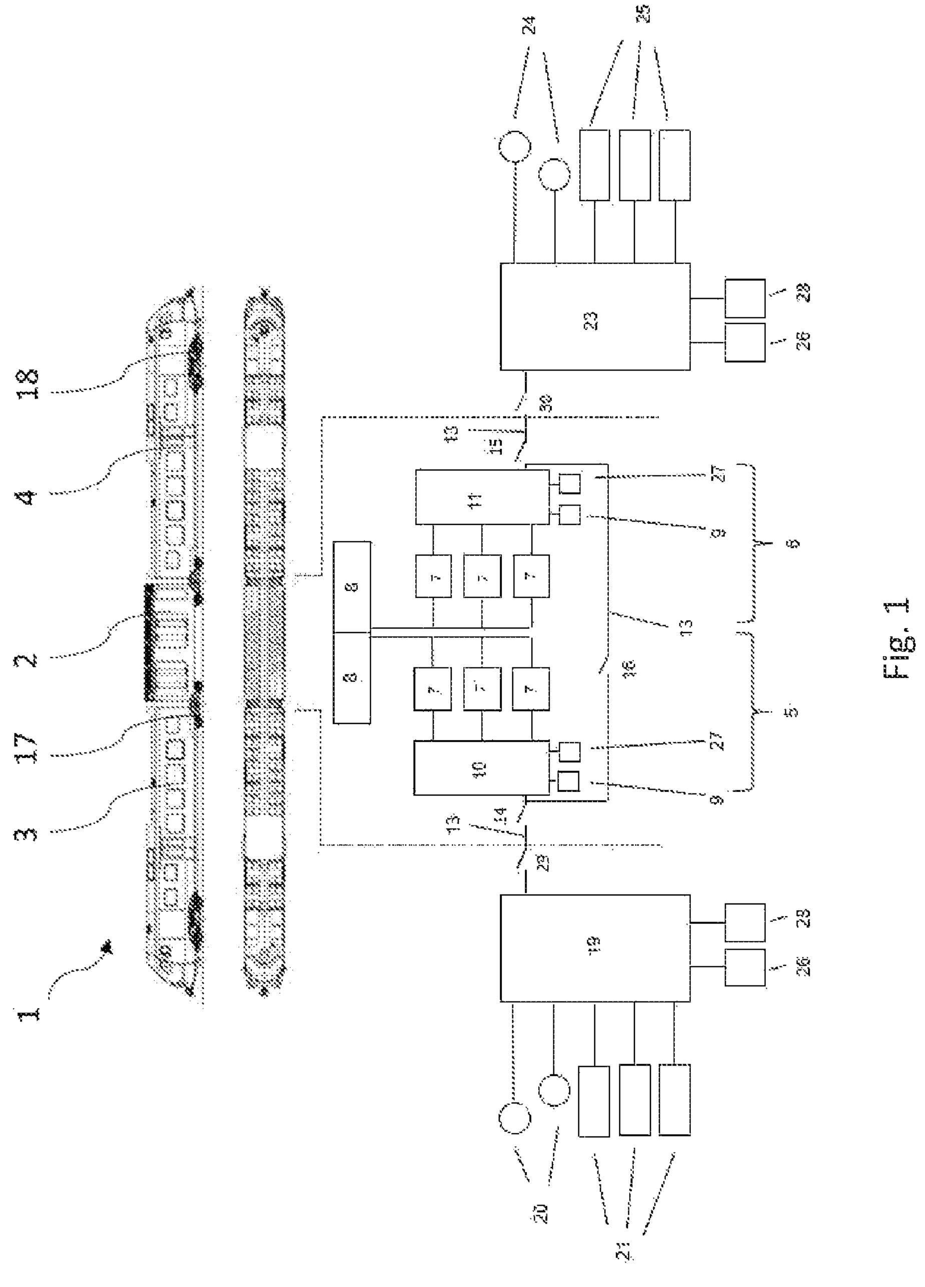

The following invention relates to a rail vehicle comprising a first power supply unit with at least one, preferably at least two fuel cells, a method for operating a rail vehicle and the use of a traction battery according to the independent patent claims.

Rail vehicles which are driven by means of fuel cells are known. Fuel cells and energy storage systems are provided in the rail vehicles. Furthermore, the rail vehicles often include auxiliary operations. The fuel cells, the energy storage systems and the auxiliary systems each operate in different voltage ranges. The voltage ranges that are optimal for the fuel cells, the energy storage systems and the auxiliary systems often deviate from each other. It is therefore necessary to provide different voltages for the individual components.

WO 2004/098064 discloses a drive train with a fuel cell, which can transmit high power and can be supplied with high voltages as used in rail vehicles. However, this powertrain is inflexible because the voltage in the powertrain is not suitable for all components of the powertrain.

EP 3 672 014 discloses a powertrain with a fuel cell. However, in this solution, the voltage in the DC link is dominated by the battery. This voltage level is not suitable for other components of the powertrain.

Thus, the powertrains disclosed in the prior art have the disadvantage that the voltage level of the powertrains cannot be used satisfactorily for the individual components of the powertrains.

It is the object of the invention to overcome the disadvantages of the prior art and, in particular to provide a rail vehicle in which the voltage level of the powertrain is suitable for several components of the powertrain.

The object is solved by a rail vehicle comprising a first power supply unit with at least one, preferably at least two, fuel cells, a method for operating a rail vehicle and the use of a traction battery according to the independent patent claims.

In particular, the object is solved by a rail vehicle comprising a first power supply unit. The power supply unit comprises at least one, preferably at least two, fuel cells, at least one fuel storage and a first fuel cell power converter. The first fuel cell power converter comprises a DC/DC converter for each fuel cell. The DC/DC converters can comprise outputs that are connected in parallel. The power supply unit may be arranged in a powerpack.

It is possible that an electrical filter is associated with each fuel cell and/or each DC/DC converter.

A DC/DC converter is a DC voltage converter which converts an electrical DC voltage supplied at the input into an electrical DC voltage with a higher voltage level or into an electrical DC voltage with a lower DC voltage level at the output.

Because the first fuel cell power converter comprises a DC/DC converter for each fuel cell, the same number of fuel cells and DC/DC converters associated with the fuel cells are present in the first power supply unit. It is possible that more DC/DC converters than fuel cells are arranged in the first power supply unit. This can be the case, for example, if additional DC/DC converters are assigned to auxiliaries. It is crucial that a DC/DC converter is assigned to each fuel cell.

It is also possible that the first power supply unit comprises a DC/AC converter, which is arranged in the power supply unit in addition to the DC/DC converters. The DC/AC converter may be associated with auxiliaries, for example.

Fuel storage may be hydrogen tanks, for example. It is also possible for the fuel storage to store methanol, butane, or natural gas. It is crucial that the fuel storage stores fuel that can be used to operate a fuel cell.

It is possible that the fuel storage comprises multiple fuel tanks. It is possible that the fuel storage comprises multiple fuel tanks that can be filled or emptied independently of each other. The fuel storage and/or the fuel tanks may be interchangeable. The fuel storage may be refuellable through a refuelling nozzle and refuelling lines.

A powerpack is a rail car that is not intended for occupancy by passengers but includes essential power supply components. The first power supply unit may preferably be arranged in a powerpack. The powerpack does not have any facilities for accommodating passengers, such as seats or toilets. However, the powerpack may be configured to allow passengers to move through the powerpack from a car in front of the powerpack to a car behind the powerpack. The powerpack may include a passageway.

The passageway may be a central aisle. Passengers may be able to stand, walk, or stay in the area of the powerpack.

Preferably, the powerpack is autonomous, i.e., in addition to the power supply units, it includes all components required for their operation, such as auxiliaries and, in particular, fuel cell energy storage units for starting up the fuel cell and, if necessary, DC/DC and/or DC/AC converters for supplying the auxiliaries. In this way, the powerpack can be operated independently of the rest of the vehicle and can be easily integrated into an existing vehicle, e.g. during vehicle conversions.

The rail vehicle can have a second power supply unit. The second power supply unit comprises at least one, preferably at least two, fuel cells, at least one fuel storage, and a second fuel cell power converter. The second fuel cell power converter comprises a DC/DC converter for each fuel cell of the second power supply unit. The DC/DC converters may comprise outputs that are connected in parallel. The second power supply unit may be arranged in the powerpack.

It is possible for the powerpack to have multiple power supply units. If the rail vehicle has two power supply units, the rail vehicle is redundantly equipped with power supply units. Thus, even if the first power supply unit or the second power supply unit fails, the rail vehicle can be supplied with power by the other power supply unit. This means that the rail vehicle can still be operated if the first power supply unit or the second power supply unit is defective and fails. This results in high operational reliability of the rail vehicle. It is possible that the power of the rail vehicle is reduced if the first power supply unit or the second power supply unit fails. Preferably, if the first power supply unit or the second power supply unit fails, the rail vehicle can move under its own power.

The second power supply unit can be designed analogously to the first power supply unit. Then the second power supply unit has the same number of fuel cells as the first power supply unit. It is possible that the second power supply unit has the same number of fuel tanks as the first power supply unit. It is possible that the second power supply unit has a substantially identical fuel cell power converter as the first power supply unit. In particular, the second power supply unit may include the same number of fuel cells and DC/DC converters as the first power supply unit.

Since the first power supply unit and the second power supply unit each have one DC/DC converter per fuel cell, the first power supply unit and the second power supply unit have the same number of DC/DC converters associated with fuel cells if they also have the same number of fuel cells. It is possible that the first power supply unit and the second power supply unit have a different number of DC/DC converters if DC/DC converters are assigned to auxiliaries.

It is possible that the first power supply unit and the second power supply unit are each arranged on one vehicle side. For example, the first power supply unit can be arranged to the left of a longitudinal axis of the rail vehicle in the direction of travel, and the second power supply unit can be arranged to the right of the longitudinal axis in the direction of travel. This results in an advantageous weight distribution.

An aisle can be located between the first power supply unit and the second power supply unit. The aisle can be a central aisle. The aisle may be designed to allow passengers in front of the powerpack to reach a range behind the powerpack.

The first power supply unit and the second power supply unit may be configured such that fuel can be conducted from the first power supply unit to the second power supply unit, or be conducted fuel from the second power supply unit to the first power supply unit.

The first fuel cell power converter may be electrically connected to a DC-Bus. In particular, the first fuel cell power converter may be electrically connected in a disconnectable manner to the DC-Bus. The second fuel cell power converter can be electrically connected to the DC-Bus, in particular in a disconnectable manner.

The switches required for disconnection can be provided in the DC-Bus or the power converters themselves.

By connecting the power supply unit to a DC-Bus, the electrical energy from the fuel cells power converters can be advantageously distributed on the rail vehicle to different rail vehicles.

The DC-Bus can be supplied with a voltage of 700V. It is also possible that the DC-Bus can be supplied with a voltage of substantially 800-1500V. It is also possible that the DC-Bus can be supplied with a voltage of essentially 1000V.

The DC-Bus can extend over several cars of the rail vehicle. The DC-Bus can also extend over every car of the rail vehicle. Electrically disconnectable connection means that the DC-Bus or the connection between the fuel cell power converters and the DC-Bus have disconnecting elements, such as switches. Then, the DC-Bus can be selectively powered or not powered with electric current from a fuel cell power converter.

The first power supply unit and the second power supply unit may be arranged in a powerpack. The powerpack may be arranged on one bogie. The powerpack may also be arranged on two bogies. At least one of the bogies may be a Jacob's bogie. It is possible that both bogies on which the powerpack is mounted are Jacob's bogies. The bogie of the powerpack or the bogies of the powerpack may be non-driven. The powerpack can also be mounted on two conventional bogies. It is also possible that the powerpack is mounted on one conventional bogie and on one Jacob's bogie.

An arrangement of the first power supply unit and the second power supply unit in a powerpack ensures that essentially no components containing fuel are arranged on rail vehicles other than on the powerpack. Thus, fuel transfers from the powerpack to another railcar are also not necessary. Fuel transitions are expensive, complex to construct, and they can have defects. Defects can leak fuel, which is highly pressurized and highly flammable. Energy can be conducted from the powerpack to another rail car by means of its electrical line, for example, by means of a DC-Bus. It is also possible to convert rail vehicles to fuel cell operation by replacing the powerpack, for example by replacing a powerpack that runs on diesel with a powerpack that runs on fuel cells. Rail cars that are not powerpacks then essentially do not need to be modified.

By arranging the powerpack on two Jacob's bogies, the powerpack can be integrated into the train composition in a particularly compact and space-saving way. The fact that the Powerpack's bogies are not driven means that there are no traction components such as traction converters or traction motors in the Powerpack. Thus, the powerpack can be designed in a weight-saving way and the usually high weight of the technical equipment can be distributed over several scales of the rail vehicle.

In the rail vehicle, the first power supply unit and/or the second power supply unit can comprise a fuel cell energy storage unit.

By assigning a fuel cell energy storage to the first and/or the second power supply unit, the first and/or the second power supply unit can be supplied with energy by means of the fuel cell energy storage when the fuel cell is not yet in operation. It is thus possible to use the fuel cell energy storage unit to start the fuel cells.

The fuel cell energy storage can be a battery. It is possible that the fuel cell energy storage comprises several batteries. It is possible that the fuel cell energy storage unit can be supplied with electrical energy by an external power supply unit. For example, it may be possible to connect the fuel cell energy storage unit to an external power source in a workshop by means of a plug. The fuel cell energy storage can then be charged in the workshop. At a later stage, the fuel cell energy storage can supply the fuel cells of the rail vehicle with energy when the fuel cell is started. This can be done via the DC-Bus, which is also fed by the DC/DC converters of the fuel cells. Once the fuel cells have started and the fuel cells are producing electrical energy, the fuel cell energy storage system can be supplied with electrical energy from the fuel cells. Then, after an intermediate standstill, the fuel cells can be supplied with electrical energy from the fuel cell energy storage unit when they are restarted. In this way, the rail vehicle can be operated essentially independently of an external power source after initial charging of the fuel cell energy storage. Only fuel for the fuel cells has to be added to the rail vehicle from time to time.

The fuel cell energy storage may be arranged in a powerpack. It is also possible that the fuel cell energy storage is arranged in another rail vehicle car. It is possible that a single fuel cell energy storage system is provided for each fuel cell. It is possible that one fuel cell energy storage system is provided for several fuel cells. It is possible that all fuel cells of a rail vehicle are connected to one fuel cell energy storage.

The powerpack may have a first DC-Bus connecting device. The powerpack may comprise a second DC-Bus connecting device.

By means of the first DC-Bus connecting device and/or the second DC-Bus connecting device, the first fuel cell power converter and/or the second fuel cell power converter may be electrically connected to the DC-Bus.

Thus, it is possible to operate both fuel cell power converters on a continuous, common DC-Bus or to assign to each fuel cell power converter its own partial DC-Bus separated from the second one.

The rail vehicle may comprise a first passenger car. The first passenger car may include a first traction power converter, a first traction motor, and in particular a first traction battery. The first traction power converter may be disconnectably connected to the DC-Bus via a third DC-Bus connection device. The first traction power converter may include a DC/AC converter for connection to the first traction motor. The fuel cell energy storage device and the traction battery may be identically configured.

By such an arrangement, the traction components such as the traction motor, the traction power converter and the traction battery are arranged on the first passenger car, while the power supply components are arranged on the powerpack. This results in a positive weight distribution and thus advantageous driving dynamics.

A passenger car is a car which comprises seats for passengers. The first passenger car may be an end car. The first passenger car may also be a middle car. It is possible that one bogie of the first passenger car is powered. It is also possible that two bogies of the first passenger car are powered. The first passenger car may include Jacob's bogies or conventional bogies. It is also possible for the first passenger car to include two Jacob's bogies.

The first passenger car may be arranged adjacent to the powerpack. The first passenger car may be connected to the powerpack by a Jakobs bogie. It is also possible for additional middle cars to be arranged between the first passenger car and the power pack.

The rail vehicle may comprise a second passenger car. The second passenger car includes at least a second traction power converter and a second traction motor. The second passenger car may include a second traction battery. The second traction power converter may be disconnectably connected to the DC-Bus via a fourth DC-Bus connection device. The second traction power converter may include a DC/AC converter for connection to the second traction motor.

For example, in the event of a traction power converter failure, it is possible to disconnect it from the DC-Bus and switch all power from all power supply units to the remaining traction power converters.

The second passenger car can be identical to the first passenger car. It is also possible that the second passenger car is designed differently from the first passenger car. It is possible that the first passenger car and/or the second passenger car are end cars and that the power-pack is arranged between the first passenger car and the second passenger car. It is possible that the two passenger cars are end cars, between which the powerpack is located, and between the first passenger car and the powerpack and/or the second passenger car and the powerpack further middle cars can be arranged. It is possible that the rail vehicle comprises a powered end car and a non-powered end car.

It is possible that the first traction power converter and/or the second traction power converter comprise a breaking resistor connected to the DC-Bus via a DC/DC converter.

Preferably, the traction power converter(s) convert kinetic energy into electrical energy during braking. This recuperated energy can then either be stored in the traction batterie or dissipated via the breaking resistor.

This allows the rail vehicle to be braked advantageously.

The object of the invention is further solved by a method for operating a rail vehicle as described above. In the method, at least one, preferably two, fuel cells generate electrical energy, which is fed into a DC-Bus via a dedicated DC/DC converter.

By feeding electrical energy from at least one, preferably at least two fuel cells, each via its own DC/DC converter, a specific voltage can be applied to a DC-Bus. This allows the sliding vehicle to be operated advantageously.

It is possible for the energy of more than two fuel cells, each having its own DC/DC converter, to be fed into a DC-Bus.

In the method, the at least one, preferably the at least two fuel cells can be started with a fuel cell energy storage.

In the method as previously described, the at least one fuel cell can be started using a traction battery on a passenger car via the DC-Bus.

In this case, no fuel cell energy storage is necessary. Thus, only a few components are required and the rail vehicle can be designed to save weight and thus be operated efficiently.

The at least one fuel cell can be started with a traction battery from a first passenger car via the DC-Bus. The traction batteries may also be started using a traction battery from the second passenger car via the DC-Bus. It is also possible that the fuel cell is started by means of traction batteries from several passenger cars.

The object of the invention is further solved by using a traction battery in one passenger car for starting at least one, preferably at least two fuel cells in another car. The other carriage may be a powerpack.

By using a traction battery in a passenger car to start a fuel cell in another car, no fuel cell energy storage is required. Thus, the rail vehicle can be designed to save weight and thus be operated efficiently.

The invention is explained in more detail in the following FIGURES. Here shows:

FIG. 1: A rail vehicle with a powerpack and a first passenger car and a second passenger car and a schematic representation of a power supply and traction equipment, FIG. 2: a circuit diagram of a powerpack with a first power supply unit and a second power supply unit, and FIG. 3: a circuit diagram of a powerpack with a first traction power converter and a first traction motor.

FIG. 1 shows a rail vehicle 1 with a powerpack 2 and a first passenger car 3 and a second passenger car 4 as well as a schematic diagram of the power supply and traction equipment. The powerpack 2 is connected to the first passenger car 3 and the second passenger car 4, each via a Jacob's bogie 17. In addition to a Jacob's bogie 17, the first passenger car 3 and the second passenger car 4 each have a conventional bogie 18. A first power supply unit 5 and a second power supply unit 6 are arranged in the powerpack 2.

The first power supply unit 5 comprises a fuel storage 8. The fuel storage 8 supplies three fuel cells 7 with fuel. The three fuel cells 7 are electrically connected in parallel to a first fuel cell power converter 10. In addition, a fuel cell energy storage unit 9 is connected to the first fuel cell power converter 10. Auxiliary power units 27 are connected to the first fuel cell power converter 10.

The second power supply unit 6 is constructed analogously to the first power supply unit 5. The first fuel cell power converter 10 is electrically connected to the second fuel cell power converter 11 via a DC-Bus 13. A first switch 16 is arranged in the DC-Bus 13.

The fuel cell power converters (10, 11) are each connected to the DC-Bus 13 via their own DC-Bus connecting device. The first fuel cell power converter 10 is connected to the DC-Bus 13 by means of the first DC-Bus connecting device 14. The second fuel cell power converter 11 is connected to the DC-Bus 13 by means of the second DC-Bus connecting device 15.

The DC-Bus has a third DC-Bus connecting device 29 through which the first traction power converter 19 is disconnectably connected. First traction power motors 20 are connected to the first traction power converter 19. Furthermore, a first traction battery 21 is connected to the first traction power converter 19. Furthermore, a breaking resistor 26 and traction auxiliaries 28 are connected to the first traction power converter 19.

Passenger air conditioners and other loads may also be connected to the first traction power converter 19.

The DC-Bus 13 leads from the powerpack 2 to the first traction power converter 19 on the first passenger car 3. Furthermore, the DC-Bus leads from the powerpack 2 to the second traction power converter 23 on the second passenger car 4. The first traction power converter 19, the first traction motor 20, the first traction battery 21, a breaking resistor 26 and traction auxiliaries 28 are arranged on the first passenger car 3. A second traction power converter 23 is arranged on the second passenger car 4. The DC-Bus 13 is connected to the second traction power converter 23 in an electrically separable manner by means of a fourth DC-Bus connecting device 30. A second traction motor 24, a second traction battery 25, and a breaking resistor 26 and traction auxiliaries 28 are connected to the second traction power converter 23.

Figure 2:
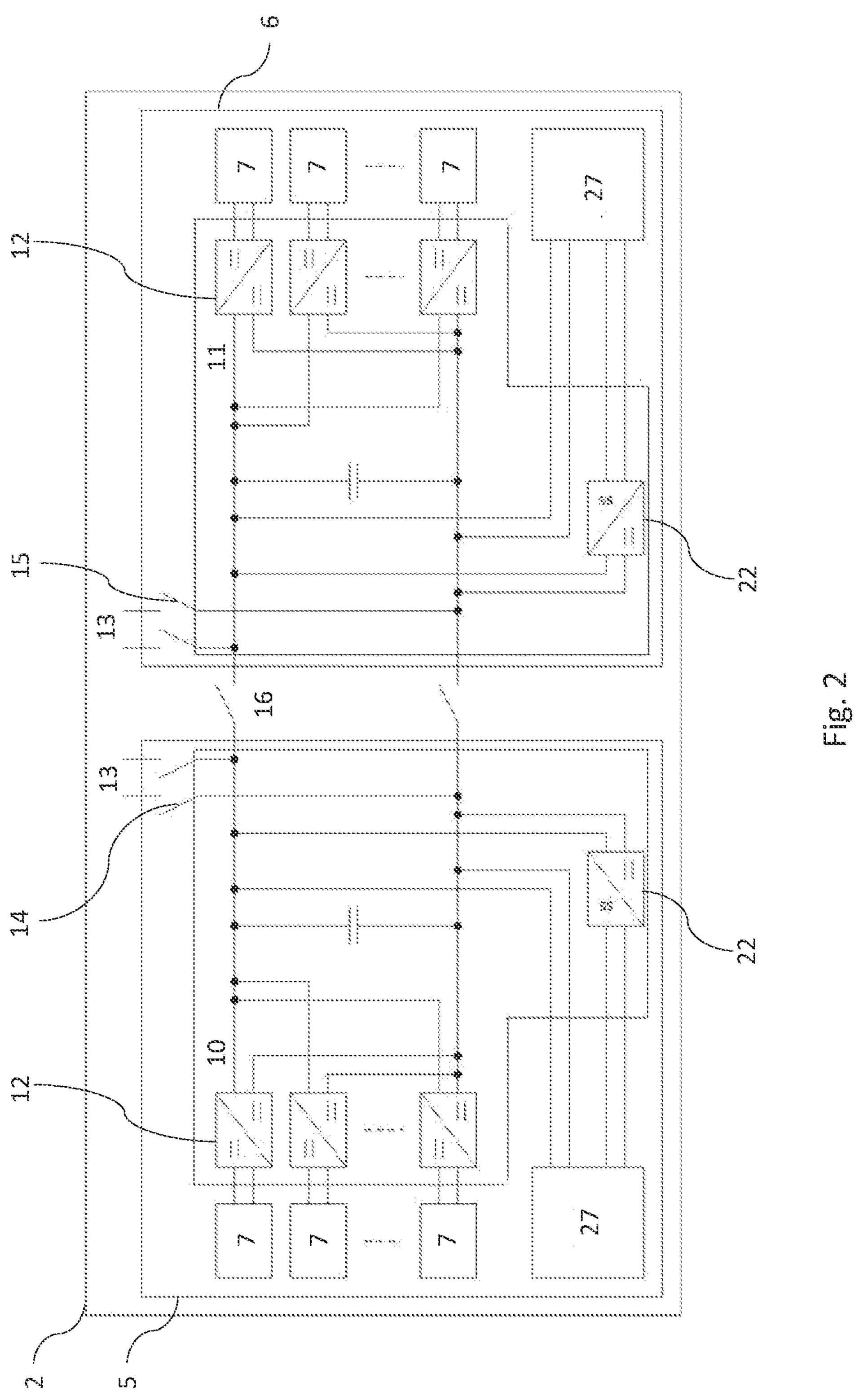

FIG. 2 shows a circuit diagram of the powerpack 2 with the first power supply unit 5 and the second power supply unit 6. The first power supply unit 5 and the second power supply unit 6 are arranged in the powerpack 2. The first power supply unit 5 and the second power supply unit 6 are electrically disconnectably connected by means of a first switch 16. The first DC-Bus connecting device 14 and the second DC-Bus connecting device 15 each have a switch. The first DC-Bus connecting device 14 and the second DC-Bus connecting device 15 can each be integrated in one of the power supply units (5, 6), preferably in the fuel cell power converters (10, 11). The first power supply unit 5 comprises a first fuel cell power converter 10. Furthermore, the first power supply unit 5 comprises three fuel cells 7. The first fuel cell power converter 10 has three DC/DC converters. Thus, the first fuel cell power converter 10 has one DC/DC converter 12 associated with each fuel cell 7 of the first power supply unit 5. The fuel cells 7 are electrically connected in parallel to the first fuel cell power converter 10. The first power supply unit 5 further comprises fuel cell auxiliaries 27. The fuel cell auxiliaries 27 are electrically connected to the first fuel cell power converter 10. A DC/AC converter 22 is connected between the fuel cell auxiliaries 27 and the first fuel cell power converter 10. The fuel cell auxiliaries 27 and the DC-Bus 13 are additionally electrically connected directly, i.e. without further components. If necessary, they can also be connected via a DC/DC converter (not shown). The fuel cell auxiliaries may comprise several components, each of which is connected to the DC-Bus 13 directly or via a DC/DC converter or via a DC/AC converter. The second fuel cell power converter 11 is analogous to the first fuel cell power converter 10 and has the same components arranged in the same manner. The same reference signs indicate the same components.

Figure 3:
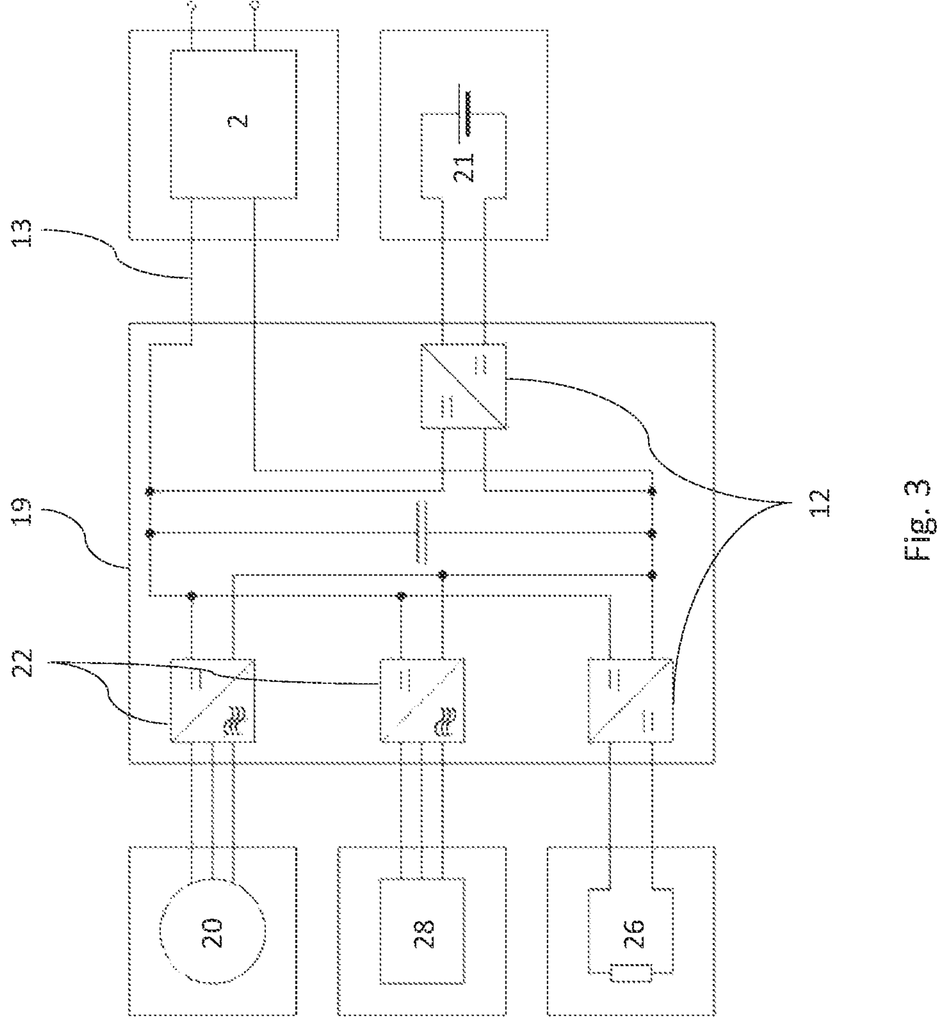

FIG. 3 shows a circuit diagram with the powerpack 2 and a first traction power converter 19 as well as a first traction motor 20. The powerpack 2 is connected by means of a DC-Bus 13 to the third DC-Bus connecting device (not shown) of the first traction power converter 19. The first traction power converter 19 includes DC/DC converters 12 and DC/AC converters 22, and a first traction motor 20 is connected to an AC/DC converter 22 of the first traction power converter 19. Traction auxiliaries 28 are connected to a DC/AC converter 22 of the first traction power converter 19. A braking resistor 26 is connected to a DC/DC converter 12 of the first traction power converter 19. First traction batteries 21 are connected to a DC/DC converter 12 of the first traction converter 19. Thus, the first traction motor 20, the first traction auxiliaries 28, the breaking resistor 26, and the first traction battery 21 are connected in parallel to the first traction power converter 19. The traction power converter 19 thus has motor power converters, brake power converters, auxiliary power converters, and battery power converters.

Electric current can be conducted from the traction batteries 21 through the traction power converter 19 to the traction motor 20. Thus, traction motor 20 is operable by electric current from traction batteries 21. Electric current is conductable from the traction batteries 21 through the traction power converter 19 to the fuel cells (not shown) of the powerpack 2. Thus, the fuel cells (not shown) of the power pack are startable by electric current from the traction batteries 21.

The invention claimed is:

1. A rail vehicle comprising a first power supply unit that has at least one fuel cell, at least one fuel store and a first fuel cell power converter, wherein the first fuel cell power converter comprises a DC/DC converter for each fuel cell, and wherein the rail vehicle has a second power supply unit, which has at least one fuel cell, at least one fuel store and a second fuel cell power converter, the second fuel cell power converter comprising a DC/DC converter for each fuel cell and wherein the first power supply unit and the second power supply unit are arranged in a powerpack and the powerpack is mounted on at least one bogie, the bogie of the powerpack or the bogies of the powerpack not being driven.

2. The rail vehicle according to claim 1, wherein the DC/DC converter has outputs which are connected in parallel.

3. The rail vehicle according to claim 1, wherein the DC/DC converter of the second fuel cell has outputs which are connected in parallel.

4. The rail vehicle according to claim 1, wherein the second power supply unit is arranged in a-powerpack.

5. The rail vehicle according to claim 1, wherein the first fuel cell power converter is electrically connected to a DC-Bus.

6. The rail vehicle according to claim 1, wherein the first and/or the second power supply unit comprises a fuel cell energy store.

7. The rail vehicle according claim 1, wherein the powerpack has at least a first DC-Bus connecting device.

8. The rail vehicle according to claim 5, wherein the rail vehicle comprises a first passenger car, the first passenger car having at least a first traction power converter, a first traction motor, wherein the traction power converter is disconnectably connected to the DC-Bus via a third DC-Bus connection device and the first traction power converter comprises a DC/AC converter for connection to the first traction motor.

9. The rail vehicle according to claim 8, wherein the rail vehicle comprises a second passenger car, wherein the second passenger car comprises at least a second traction power converter, a second traction motor, wherein the second traction power converter is disconnectably connected to the DC-Bus via a fourth DC-Bus connecting device and the second traction power converter comprises a DC/AC converter for connection to the second traction motor.

10. The rail vehicle according to claim 8, wherein the first traction power converter and/or the second traction power converter comprise a breaking resistor connected to the DC-Bus via a DC/DC converter.

11. The rail vehicle according to claim 9, wherein the first passenger car and/or the second passenger car are driven end cars.

12. The rail vehicle according to claim 11, wherein the rail vehicle has non-driven center cars.

13. The rail vehicle according to claim 1, wherein the powerpack has no passenger seats.

14. A method for operating the rail vehicle according to claim 1, wherein the at least one fuel cell generates electrical energy which is fed into a DC bus in each case via a dedicated DC/DC converter.

15. The method according to claim 14, wherein the at least one fuel cell is started with the aid of a fuel cell energy storage.

16. The method according to claim 14, wherein the at least one fuel cell is started with the aid of a traction battery on a passenger car via the DC-Bus.

* * * * *